(12) United States Patent
Gazzadi Poggioli et al.

(10) Patent No.: US 11,907,781 B2
(45) Date of Patent: Feb. 20, 2024

(54) DATABASE SYSTEM FOR MARKING CODES FOR LIQUID FOOD PACKAGES

(71) Applicant: Tetra Laval Holdings & Finance S.A., Pully (CH)

(72) Inventors: Matteo Gazzadi Poggioli, Modena (IT); Gaurav Naik, Singapore (SG); Biagio Roberti, Milan (IT); Gregorio Occhiogrosso, Bitetto (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/776,880

(22) PCT Filed: Nov. 12, 2020

(86) PCT No.: PCT/EP2020/081885
§ 371 (c)(1),
(2) Date: May 13, 2022

(87) PCT Pub. No.: WO2021/094441
PCT Pub. Date: May 20, 2021

(65) Prior Publication Data
US 2022/0343124 A1 Oct. 27, 2022

(30) Foreign Application Priority Data
Nov. 14, 2019 (EP) .................................... 19209110

(51) Int. Cl.
*G06K 19/06* (2006.01)
*G06F 16/901* (2019.01)
*G06Q 50/04* (2012.01)

(52) U.S. Cl.
CPC ... *G06K 19/06037* (2013.01); *G06F 16/9017* (2019.01); *G06K 19/06028* (2013.01); *G06Q 50/04* (2013.01)

(58) Field of Classification Search
CPC ........ G06K 19/06037; G06K 19/06028; G06F 16/9017; G06Q 50/04
(Continued)

(56) References Cited

U.S. PATENT DOCUMENTS 6,542,933 B1 * 4/2003 Durst, Jr. ............ G06F 16/9554
709/219
9,514,343 B1 * 12/2016 Bolts .................... G07G 1/0045
(Continued)

FOREIGN PATENT DOCUMENTS

EP 3540664 A1 9/2019
WO 2016/148761 A1 9/2016

OTHER PUBLICATIONS

International Search Report and Written Opinion in PCT Application No. PCT/EP2020/081885 dated Jan. 20, 2021 in 10 pages.
(Continued)

*Primary Examiner* — Paultep Savusdiphol
(74) *Attorney, Agent, or Firm* — Knobbe, Martens, Olson & Bear, LLP

(57) ABSTRACT

A database system can comprise a plurality of code databases storing marking codes that uniquely identifies packages of liquid food and comprises package production data which uniquely identifies production of the individual package. The respective code database stores a respective subset of the marking codes. An input sub-system of the database system is configured to receive a current marking code. The database system comprises a set of resource locators. The respective resource locator is configured to: receive the current marking code from the input sub-system, extract the package production data from the current marking code, identify a current code database among the plurality of code databases based on the package production data, and redirect the current marking code to the current code database.

17 Claims, 6 Drawing Sheets

(58) Field of Classification Search
USPC .................................................. 235/385, 494
See application file for complete search history.

(56) References Cited

U.S. PATENT DOCUMENTS

| | | | | |
|---|---|---|---|---|
| 2003/0150908 A1* | 8/2003 | Pokorny | ............ | G05B 13/0285 235/375 |
| 2003/0150909 A1* | 8/2003 | Markham | ............ | G06N 5/048 235/376 |
| 2007/0215685 A1* | 9/2007 | Self | ........ | G06Q 30/06 235/375 |
| 2008/0073432 A1* | 3/2008 | Barenburg | ............ | G06Q 10/08 235/385 |
| 2012/0055984 A1* | 3/2012 | Van Megchelen | ..... | G06Q 30/02 235/494 |
| 2014/0263674 A1* | 9/2014 | Cerveny | .......... | G06K 19/06037 235/494 |
| 2015/0039614 A1* | 2/2015 | Daly | ..................... | G16B 30/00 707/756 |
| 2015/0102100 A1* | 4/2015 | Hattrup | .................. | G06Q 30/02 53/64 |
| 2018/0025185 A1* | 1/2018 | Hattrup | ................ | G06K 15/024 705/14.1 |
| 2018/0260466 A1* | 9/2018 | Jacoby | .................... | G06F 16/27 |
| 2021/0406814 A1* | 12/2021 | Alsayar | ................ | G06F 16/955 |

OTHER PUBLICATIONS

Sato Naoki: "Azure Cosmos DB Deep Dive ~ Partitioning, Global Distribution and Indexing ~", Sep. 30, 2019 (Sep. 30, 2019), Retrieved from the Internet: URL: https://www.slideshare.net/satonaoki/20190927-dbts-azure-cosmos-db [retrieved on May 12, 2020].

* cited by examiner

DATABASE SYSTEM FOR MARKING CODES FOR LIQUID FOOD PACKAGES

TECHNICAL FIELD

The present disclosure generally relates to manufacture of packages for liquid food and, in particular, to database systems for storage of marking codes for such packages.

BACKGROUND ART

Every day across the world, billions of litres of water, milk, juice and other liquid foods are consumed. A large proportion of the liquid food is distributed in paper-based packages, also known as carton packages. These packages are produced to protect both the nutritional value and the taste of the liquid food inside. The underlying technology greatly facilitates packaging and distribution of liquid food products across the world.

The present Applicant has identified a need to mark each package with a unique code. The provision of a unique code on each package enables various functionality, such as tracking and tracing the packages throughout the manufacturing and distribution chain, verifying the authenticity of the package, linking to web content related to the package for access by consumers or retail personnel, associating the codes with promotional campaigns and lotteries, etc.

Packages for liquid food are produced on an industrial scale for the world market. Huge numbers of packages are produced each year. For example, within the ecosystem of Tetra Pak®, 188 billion ($10^9$) packages were produced in 2016. Considering that packaged products may have a shelf life of 6 months to 1 year, or even longer, for example up to 5 years, a huge number of unique codes need to be produced and stored in a database system. The deployment of the codes in such an environment is likely to result in data in excess of 1 PB.

EP3540664 discloses a robust technique for providing marking codes for packages containing liquid food, where the respective marking code uniquely identifies an individual package. The marking code is based on payload data, which uniquely represents the production of the individual package and may be indicative of the time and/or the location of the production. The payload data is encrypted to make it difficult to guess valid codes and generate fraudulent codes. The marking code is formed by combining the encrypted payload data with a non-encrypted header portion. The marking codes are provided on the packages and are also entered in a database, optionally in association with additional data. To accelerate search and reduce data storage volume per database, EP3540664 proposes to provide databases in different production regions, for example a first database in Europe and a second database in North America, and to store marking codes for packages produced by plants in Europe and North America in the first database and the second database, respectively.

When storing the marking code in a database system it is desirable to configure the database system to achieve a fast response time to a query containing a marking code from a package. It is also desirable to make the database system flexible and scalable.

SUMMARY

It is an objective to at least partly overcome one or more limitations of the prior art.

A further objective is to provide a flexible and scalable database system for storage and retrieval of marking codes for packages for liquid food.

Yet another objective is to enable fast and efficient search for a marking code in a database system that allows for storage of data on the order of 1 PB or more.

One or more of these objectives, as well as further objectives that may appear from the description below, are at least partly achieved by a database system, a system, a control method, and a computer-readable medium according to the independent claims, embodiments thereof being defined by the dependent claims.

A first aspect of the present disclosure is a database system, comprising: an input sub-system for receiving marking codes corresponding to data carriers on packages for liquid food, the respective marking code comprising package production data which uniquely identifies production of an individual package; a plurality of code databases storing the marking codes, wherein a respective code database among the plurality of code databases stores a respective subset of the marking codes; a set of resource locators, wherein a respective resource locator in the set of resource locators is configured to: receive a current marking code from the input sub-system, extract the package production data from the current marking code, identify a current code database among the plurality of code databases based on the package production data, and re-direct the current marking code to the current code database.

In some embodiments, the database system further comprises: a set of lookup databases, wherein the respective resource locator is configured for connection to a respective lookup database in said set of lookup databases, and the respective lookup database is arranged to associate different values of at least one data element in the package production data with different code databases among said plurality of code databases.

In some embodiments, resource locators in said set of resource locators are connected in pairs with lookup databases in said set of lookup databases, and the respective lookup database is co-located with the respective resource locator in each of said pairs.

In some embodiments, said set of lookup databases comprises a main lookup database and one or more replications of the main lookup database.

In some embodiments, n the respective resource locator is further configured to search the package production data for said at least one data element, extract a current value of said at least one data element, and identify, based on said at least one data element, the current code database in a lookup database in the set of lookup databases.

In some embodiments, the respective code database has an address in the database system, said address including at least one predefined data element in the package production data.

In some embodiments, the respective resource locator is configured to search the package production data for said at least one predefined data element, extract a current value of said at least one predefined data element, include the current value in an address template to generate the address for the current code database in the database system, and re-direct the current marking code to the address.

In some embodiments, said at least one predefined data element comprises an identifier of a provider of one or more plants for producing the packages.

In some embodiments, said set of resource locators comprises two or more resource locators which are arranged in different geographic regions.

In some embodiments, the respective code database is located in a respective distribution region among a plurality of distribution regions, and said respective subset of the marking codes in the respective code database corresponds to packages that are distributed at least partly within the respective distribution region.

In some embodiments, the plurality of code databases comprises at least one main code database and one or more replications of the main code database.

In some embodiments, the package production data is encrypted in the marking code, and the respective resource locator is further configured to decrypt the marking code to extract the package production data.

A second aspect of the present disclosure is a system, comprising: a package for liquid food, the package having a data carrier containing a marking code, the marking code comprising package production data which uniquely identifies production of the package; and a database system in accordance with the first aspect or any embodiment thereof.

A third aspect of the present disclosure is a control method for a database system. The control method comprises: receiving, by an input sub-system of the database system, a current marking code which corresponds to a package of liquid food and comprises package production data which uniquely identifies production of the package; providing, by the input-sub-system, the current marking code to a resource locator in the database system; and operating the resource locator to: extract the package production data from the current marking code; identify, among a plurality of code databases that store a respective subset of a plurality of marking codes, a current code database based on the package production data; and re-direct the current marking code to the current code database.

A fourth aspect of the present disclosure is a computer-readable medium comprising computer instructions which, when executed by a processing system, cause the processing system to perform the method of the third aspect or any embodiment thereof.

Still other objectives, as well as embodiments, features, aspects and advantages will appear from the following detailed description as well as from the drawings.

BRIEF DESCRIPTION OF THE DRAWINGS

Embodiments will now be described, by way of example, with reference to the accompanying schematic drawings.

DETAILED DESCRIPTION

Embodiments will now be described more fully hereinafter with reference to the accompanying drawings, in which some, but not all, embodiments are shown. Indeed, the invention may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

As used herein, the term "and/or" comprises any and all combinations of one or more of the associated listed items.

As used herein, a "set" of items is intended to imply a provision of one or more items.

As used herein, "liquid food" refers to any food product that is non-solid, semi-liquid or pourable at room temperature, including beverages, such as fruit juices, wines, beers, sodas, as well as dairy products, sauces, oils, creams, custards, soups, pastes, etc, and also solid food products in a liquid, such as beans, fruits, tomatoes, stews, etc.

As used herein, "a package" refers to any package or container suitable for sealed containment of liquid food products, including but not limited to containers formed of cardboard or packaging laminate, e.g. cellulose-based material, and containers made of or comprising plastic material.

Well-known functions or constructions may not be described in detail for brevity and/or clarity. Unless otherwise defined, all terms (including technical and scientific terms) used herein have the same meaning as commonly understood by one of ordinary skill in the art to which this invention belongs.

Like reference signs refer to like elements throughout.

Figure 1A:
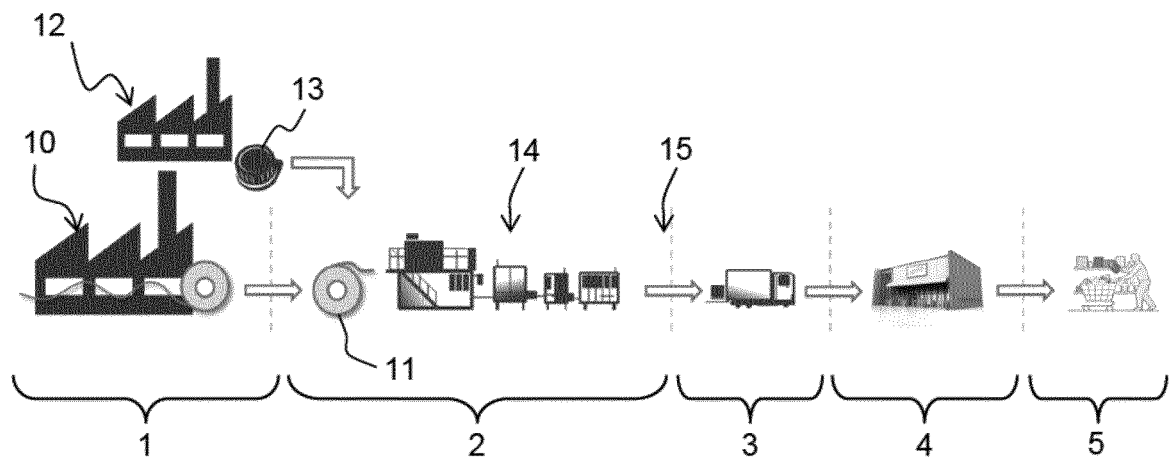
FIG. 1A is an overview of a manufacturing and distribution chain for packages for liquid food.

FIG. 1A is a schematic illustration of a manufacturing and distribution chain for packages for liquid food. The illustrated chain comprises a manufacturing stage 1 for manufacturing raw material for the packages, a filling stage 2 for manufacturing packages containing liquid food, a distribution stage 3 for distributing the packages containing liquid food, a retail stage 4 for providing the packages to consumers, and a consumer stage 5 in which the packages are handled by a consumer and the liquid food is consumed.

In the manufacturing stage 1, a sheet material for the packages is manufactured at a converting factory (plant) 10. The sheet material is typically paper-based and provided to the filling stage 2 in rolls 11. In the illustrated example, stage 1 further involves a dedicated factory (plant) 12 that manufactures caps 13 for the packages, typically of plastic material. If the packages are formed without a cap, the factory 12 is absent from stage 1. It is also conceivable that stage 1 includes additional factories that manufacture specific components for the package.

Figure 1B:
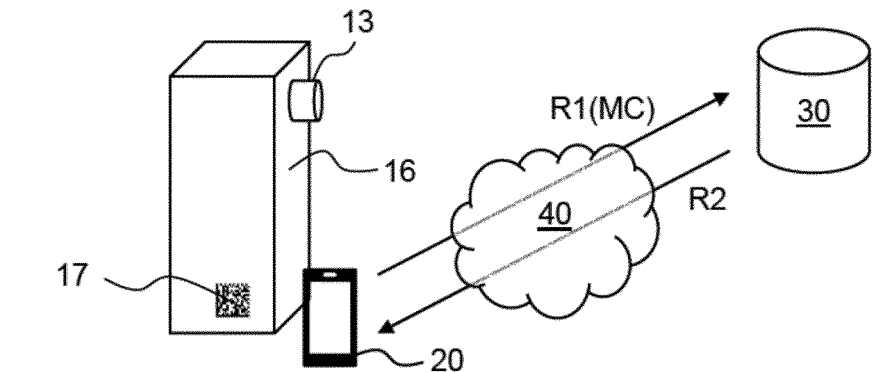
FIG. 1B is a schematic illustration of interaction with a marking code on such a package.

In the filling stage 2, a filling factory (plant) 14 operates on the sheet material 11, the caps 13 and the liquid food to provide packages containing liquid food. For example, a production line at the filling plant 14 may form the sheet material 11 into a container, fill the liquid food into the container, and seal the container to form the package. The production line may also attach a cap 13 to the container. FIG. 1B shows an example of a package 16 produced by the filling plant 14. Stage 2 may further comprise external handing 15 of packages, e.g. palletizing, before entering the distribution stage 3.

It should be understood that the manufacturing chain generally may involve many different converting plants 10, cap plants 12 and filling plants 14, which may be distributed globally. Each of the plants 10, 12, 14 may include a plurality of production lines.

As indicated in FIG. 1B, the package 16 comprises a data carrier 17 that represents a marking code. The data carrier 17 may be implemented by any known technique for providing an article of manufacture with a code. In one example, the data carrier 17 is printed onto the package 16, e.g. as sequence of human-readable symbols (e.g. characters), or a machine-readable graphical symbol such as one or more bar codes or a 2D code (DataMatrix, QR code, etc.). In another example, the data carrier is an electronic tag, in which the code is stored and made available for retrieval by wireless communication with the tag, e.g. in accordance to any conventional standard for this purpose, such as NFC, RFID, BLE, etc.

The marking code is generated to be unique to the package 16 within the entire eco-system of plants 10, 12, 14 within the manufacturing chain as exemplified in FIG. 1A, at least for a predefined lifetime. The marking code may be applied to the package in either of the plants 10, 12, 14 shown in FIG. 1A. For example, marking codes may be applied by the converting plant 10 at predefined positions on the sheet material 11 so as to be located on each of the packages 16 produced by filling plant 14. In another example, a marking code may be applied by the cap plant 12 to each cap 13. In a further example, a marking code is applied to the sheet material 11, the cap 13, the intermediate container or the package 16 by the filling plant 14. It is to be understood that the package 16 may contain more than one such unique marking code, e.g. one on the cap 13 and one on the package 16. It is also conceivable that a unique marking code is provided to the packages, or groups of packages, at the subsequent handling 15 (e.g. palletizing).

The provision of a unique code on each package 16 enables many different applications, including tracking and tracing packages throughout the manufacturing and distribution chain (FIG. 1A), verifying the authenticity of a package, linking to web content related to a package for access by consumers or retail personnel, associating the codes with promotional campaigns and lotteries, causing automatic actions in machines that are used in stages 1-5 (FIG. 1A), such as any equipment in a filling plant 14, cooling systems in transportation vehicles, warehouse trucks, robots, refrigerators, etc.

FIG. 1B exemplifies the use of coded packages. A current marking code is read from the data carrier 17 on the package 16 and entered into an input device 20, e.g. by manual entry or by use of a scanner in or connected to the input device 20. The input device 20 may be a mobile phone, as shown, or any other network connected device. The input device 20 transmits a request R1 containing the current marking code, MC, to a database system 30 over a communication network 40, for example a WAN (Wide Area Network), LAN (Local Area Network), PAN (Personal Area Network), or any combination thereof. If the database system 30 is provided as a cloud-based service, the network 40 typically includes a WAN, such as the Internet. The database system 30 is configured to, in response to the request R1, locate a data record corresponding to the current marking code within the database system and may, e.g., make an entry in the data record to indicate that the current marking code has been scanned and/or return a response message R2 to the input device 2. The response message R2 may, for example, contain a confirmation of receipt, a verification of the authenticity of the package, information associated with the package and/or its production, e.g. via a link to web content, etc.

Embodiments of the present invention are related to structures and functions of the database system 30.

The database system 30 may be a proprietary system or be based on a commercially available database platform, for example a cloud computing platform that provide virtual machine instances or database-as-a-service (DBaaS). In one specific implementation example, the database system 30 is implemented on Microsoft Azure Cosmos DB, which is a globally distributed, multi-model database service.

In various embodiments disclosed herein, the database system 30 is configured to overcome one or more challenges. As noted above, the database system 30 needs to handle data on the scale of Petabytes (PB) or larger. On this scale, the storage of data in a single database becomes expensive in terms of resources needed for storage and retrieval. Further, from a usability standpoint, fast response times are desirable, for example 3 seconds or less. With a single database and world-wide distribution of packages, such response times are difficult to achieve. Many commercial databases have a turn-key function to geo-replicate an entire database to other geographic locations. While this may solve the problem of response speed, it will also multiply the cost of the database system with each replication of the huge database.

Since the marking codes originate from different plants, it is conceivable to distribute the marking codes over databases located in different production regions. Such separation of the marking codes into different databases might improve the response time without multiplication of databases. However, while it is possible to pre-configure the input devices 20 for use in a specific production region so that the request R1 by default is sent to a specific database in the database system 30, such a solution lacks in flexibility and scalability.

To overcome one or more to the above-identified challenges, the present Applicant has identified a number of inventive concepts that may be applied to the database system 30 separately or in combination.

One inventive concept is to selectively store the marking codes in databases located in different geographic regions, so that the respective database stores a respective subset of the marking codes. These code-storage databases ("code databases") are denoted subset databases in the following and designated by "SDB". The respective SDB may store additional data associated with the respective subset of marking codes, or store a parameter linking the respective marking code to such additional data in an additional database, which may or may not be co-located with the respective SDB. The respective subsets in the SDBs may be mutually exclusive or may partially overlap. The provision of SDBs will increase the geographic coverage of the database system 30 without significantly increasing the total amount of data stored in the database system 30.

Another inventive concept is the provision of so-called resource locators, which are "redirection devices" that are configured to receive requests R1 from input devices 20 and use the marking code in the respective request R1 to direct the request R1 to a relevant database among a plurality of databases in the database system 30, where the relevant database contains a data record with the marking code. Thus, the resource locators operate as code-based routers in the database system. The resource locators enable a flexible and scalable database system, where a request R1 containing any marking code from any type of input device 20 will be directed to a relevant database.

Figure 2A:
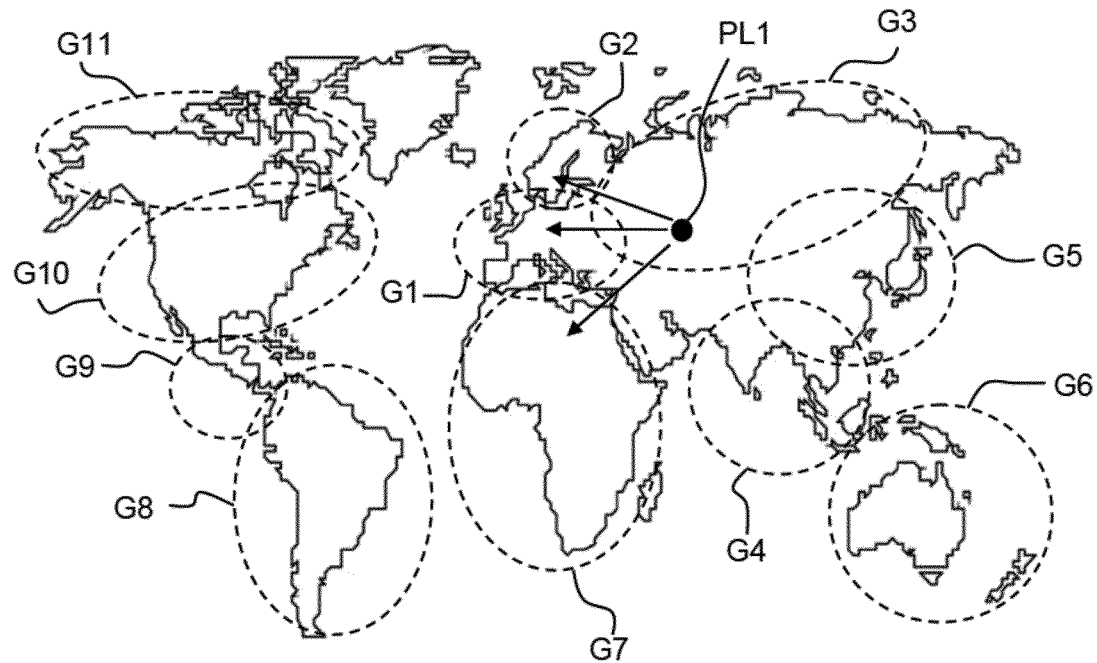
FIGS. 2A-2C are schematic plots of predefined geographical regions and associated resources of a database system in accordance with an example.

Another inventive concept is to define distribution regions rather than production regions and locate the above-mentioned SDBs in these distribution regions. The distribution regions may be defined with any granularity and may or may not partially overlap. The distribution regions designate geographic regions in which the packages are distributed to consumers, typically at the locations of the retail stage 4 and/or the consumer stage 5 in FIG. 1A. The underlying rationale is that the SDBs thereby will be located in closer proximity to the users that will use input devices 20 to submit requests R1. FIG. 2A shows a non-limiting example of such distribution regions, roughly indicated by dashed lines. In the illustrated example, the distribution regions include Mainland Europe (G1), the Nordic Countries (G2), Russia (G3), India and Indochina (G4), East Asia (G5), Australasia (G6), Africa (G7), South America (G8), Central America (G9), the United States (G10), and Canada (G11). FIG. 2A also indicates a production location (plant) PL1, which is located in G3 and produces packages for distribution in G1, G2 and G7. It is realized that locating an SDB in, e.g. G1, would be beneficial in terms of response time.

Figure 2B:
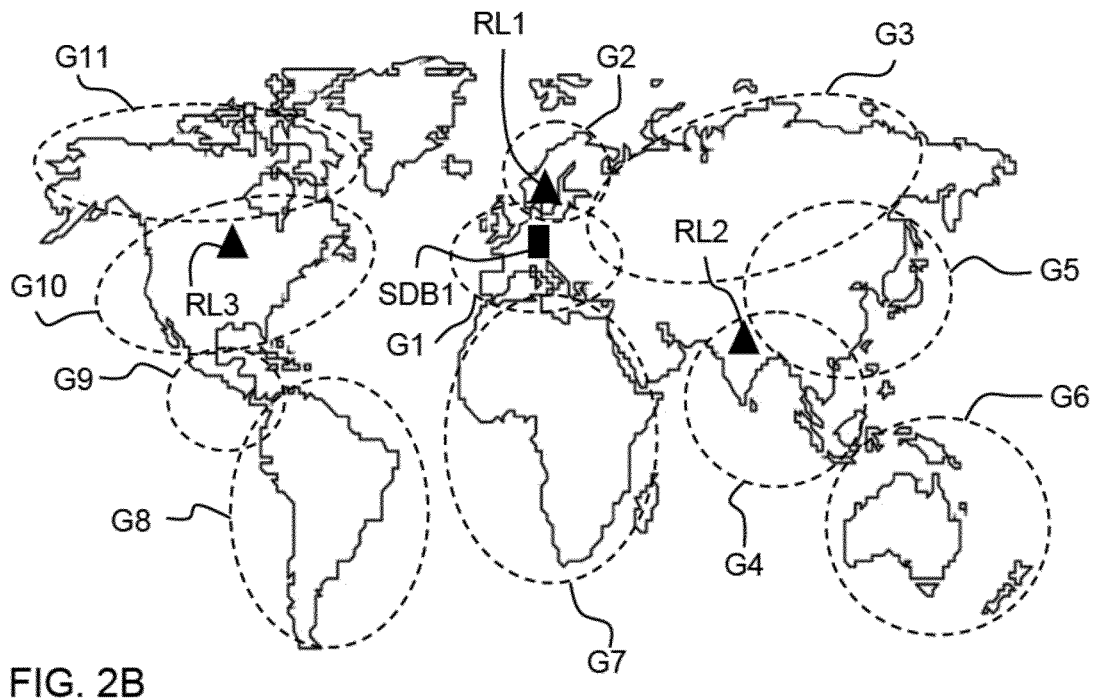

Another inventive concept is to geographically distribute the resource locators, e.g. in different distribution regions, to reduce response time. Such distribution or replication of resource locators has no significant impact on the required resources of the database system, since the resource locators are typically small and efficient modules. FIG. 2B shows a non-limiting example of such resource locators RL1, RL2, RL3 which are distributed across the world, with RL1 in G2, RL2 in G4 and RL3 in G10. Each of RL1-RL3 may be configured to direct a request R1 containing a marking code on a package produced at PL1 (FIG. 2A) to a database SDB1 in G1. It is realized that a request R1 generated by an input device in any one of the relevant distribution regions, G1, G2 and G7 may be quickly and efficiently re-directed by RL1 to SDB1.

Figure 2C:
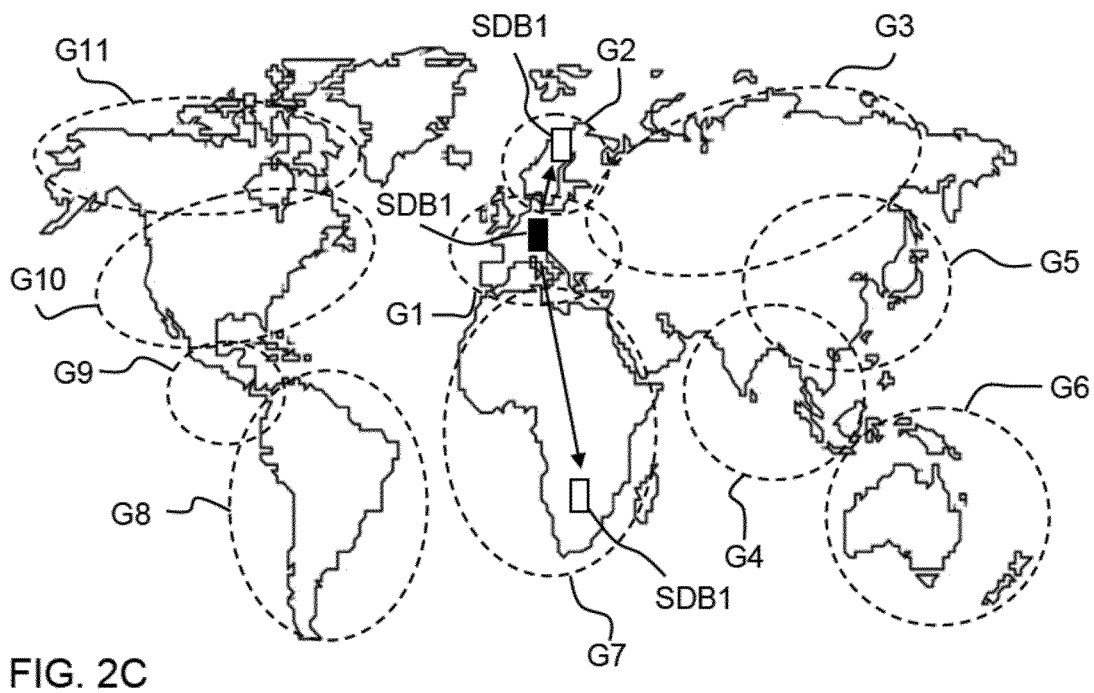

Another inventive concept involves replication or duplication of an SDB in a first distribution region into one or more second distribution regions, where the SDB contains marking codes for packages that are distributed within the second distribution region(s), in addition to the first distribution region. This may be seen to result in a main SDB in the first distribution region and one or more slave SDBs in the second distribution region(s). FIG. 2C shows a non-limiting example of a main SDB1 (filled) located in G1 and two slave SDB1 (open) located in G2 and G7, respectively. It is realized that the provision a slave SDB may further reduce response time. Since the main SDB only contains a subset of all marking codes, the replication results in a modest increase in the total data stored within the database system 30. Also, even if the database system contains plural main SDBs, and several main SDBs are replicated, the drawback of increasing the total amount of data in the database system may be offset by the reduced response time.

Figure 3:
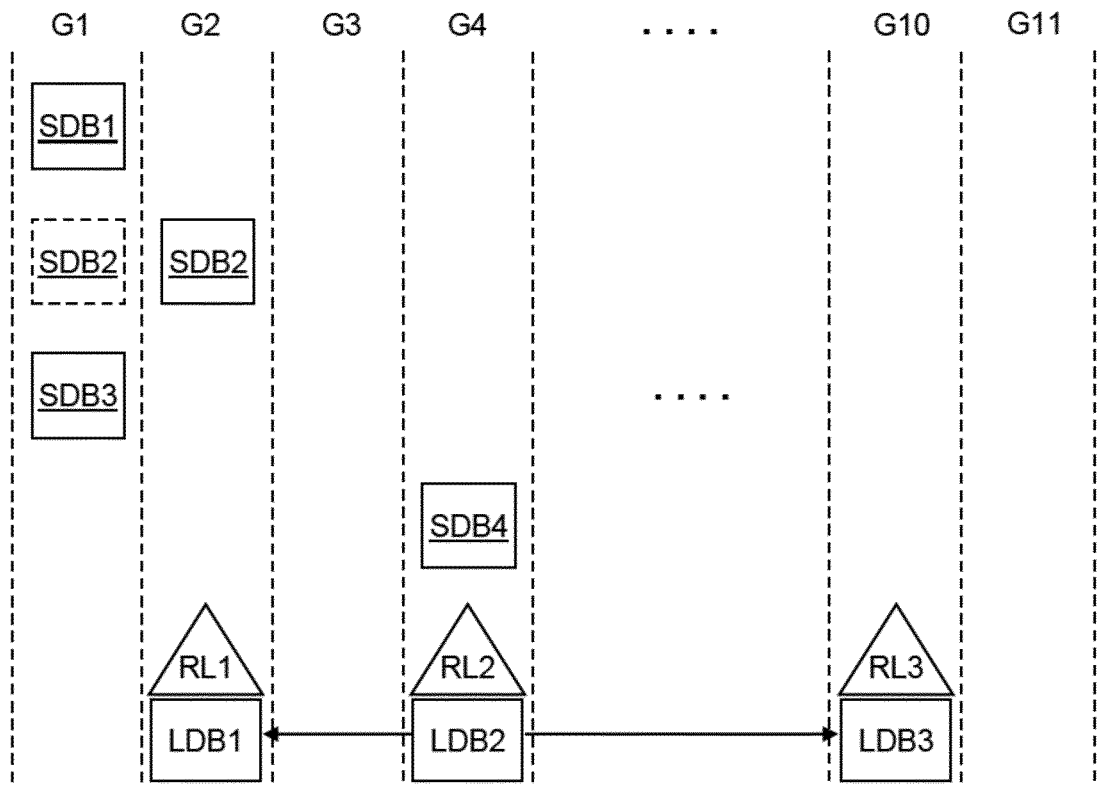
FIG. 3 is a schematic diagram of resources included in the database system in accordance with an example.

As noted above, one or more of the inventive concepts may be combined depending on the required performance of the database system 30. FIG. 3 is a block diagram of a database system which implements all of the inventive concepts and which is structured in accordance with distribution regions G1-G11 and comprises resource locators RL1-RL3, main subset databases SDB1-SDB4, and a slave subset database SDB2. In the illustrated example, the resource locators RL1-RL3 are co-located with a respective lookup database LDB1-LDB3, which are described further below.

Figure 4A:
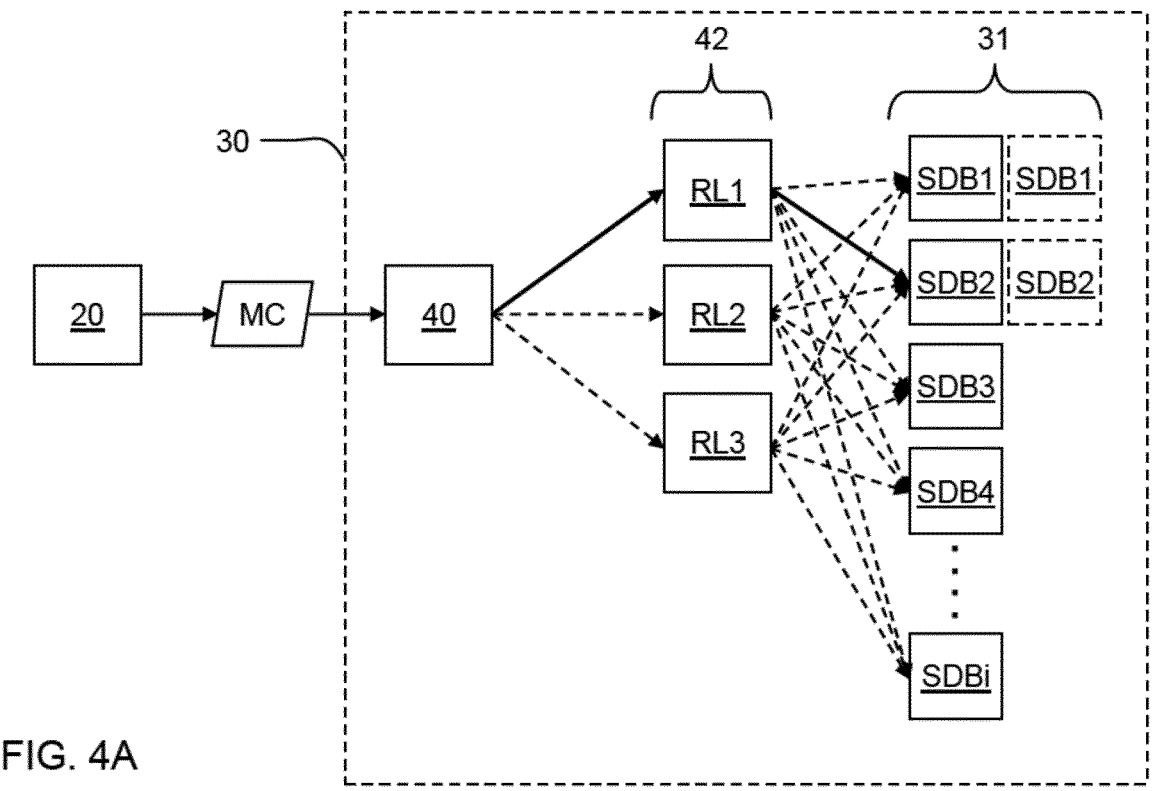
FIG. 4A is a block diagram of a database system receiving and processing a current marking code.

FIG. 4A is an overview of a database system 30 in accordance with an embodiment. The database system 30 comprises an input sub-system 40, three resource locators RL1-RL3, main subset databases SDB1-SDBi and two slave subset databases SDB1, SDB2. The resource locators are generally designated by 42, and the subset databases are generally designated by 31. In the example of FIG. 4A, the database system 30 receives a request with a current marking code, MC, from an input device 20. The request is received by the input sub-system 40, which is configured to apply any suitable traffic-routing protocol to select and direct the request to one of the resource locators 42. Thus, the input sub-system 40 may operate as a "traffic manager". In FIG. 4A, as indicated by a solid arrow, the traffic manager 40 re-directs the request to RL1. For example, the resource locator may be selected to give the lowest latency, to give a predefined load distribution, to be in a specific geographic region in relation to the location of the input device 20. In one embodiment, the traffic manager operates to receive a DNS query from the input device 20 and selects and returns the network address of one of the resource locators to the input device 20, which is thereby enabled to communicate the request to the selected resource locator. In the example of Microsoft Azure Cosmos DB, the traffic manager 40 may be implemented based on the Azure traffic manager. Each of the resource locators 42 is operable to re-direct incoming requests to one or more subset databases 31. In the example of FIG. 4A, each resource locator 42 is operable to re-direct the incoming request to any one of the subset databases 31. However, it is also conceivable that the resource locators 42 are assigned partly different subset databases to which they are capable of re-directing incoming requests. In FIG. 4A, as indicated by a solid arrow, RL1 re-directs the request with the current marking code, MC, to the main subset database SDB2 which contains this specific marking code, MC. SDB2 is then queried for this specific marking code, whereupon SDB2 may be updated with information related to the request and/or data stored in association with the marking code in SDB2 may be retrieved and returned to the input device 20 or to another device (not shown).

Embodiments will be further exemplified in the following with reference to a marking code that comprises payload data which is unique to the production of the individual package and which is encrypted by a predefined encryption algorithm. The encryption serves to protect the PPD, to make it difficult to guess a valid marking code based on another marking code and to minimize the risk of fraudulent generation of marking codes. Generally, the marking code consists of a sequence of values, for example binary values. The payload data, which is denoted package production data (PPD) in the following, may include data elements that identify the location of production and/or the time of production. In a first example ("inline example format"), the data elements in the PPD include identifiers of the producer that operates a plant (ProducerID), the plant (PlantID), the production line in the plant (LineID), the equipment where the marking code is added to the package (EquipmentID), and the PPD further identifies the current time of production, for example by year, day, hour, minute, second and a sub-second resolution counter (PackageCounter), which may or may not be randomized. In a second example ("offline example format"), the data elements in the PPD include identifiers of the plant (ProductionUnitID), a production batch, and a package within the production batch, where the production batch may be identified by a time period, for example current year and month, and a batch number within the time period (RequestNumber), and where the package may be identified by a package number within the production batch (PackageCounter). The package number may or may not be randomized. The marking code may further comprise a non-encrypted header portion, which may or may not be obfuscated and may contain data enabling decryption and validation of the encrypted PPD. Implementation examples and further description of the marking codes are found in aforesaid EP3540664, which is incorporated herein in its entirety by reference.

Figure 4B:
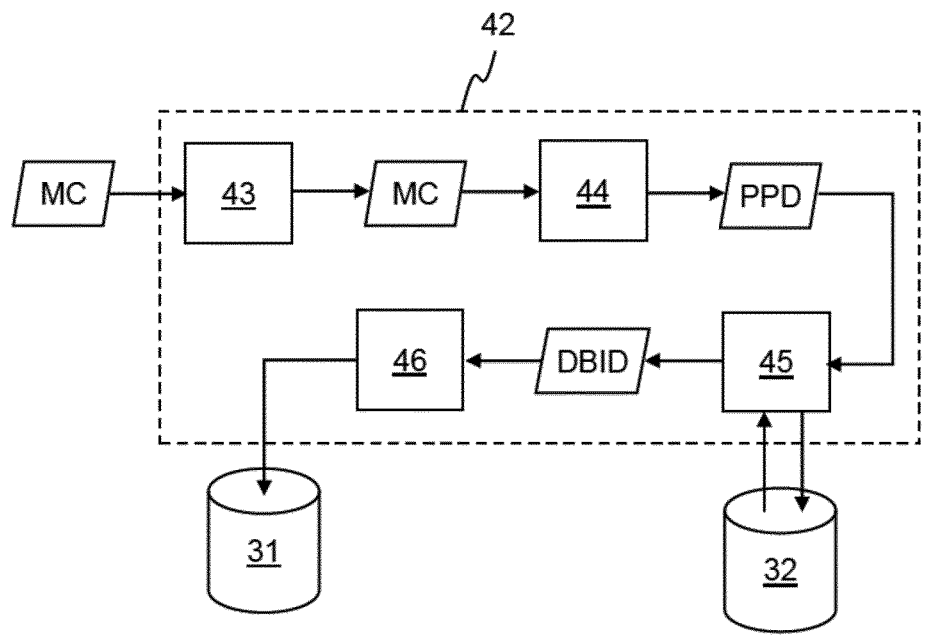
FIG. 4B is a block diagram of a resource locator in the database system of FIG. 4A.

FIG. 4B is a schematic block diagram of a resource locator 42 in accordance with an embodiment. The resource locator 42 comprises an input module 43 configured to receive incoming requests containing a marking code, MC, and to provide the marking code to an extraction module 44. The extraction module 44 is configured to decrypt the marking code, specifically the encrypted PPD, to extract the PPD. The extraction module 44 may apply a predefined encryption algorithm or function on the marking code, or part thereof, where the encryption algorithm may be selected or configured based on data in the non-encrypted header portion, if included in the marking code. It is realized that the encryption algorithm used by module 44 is matched to the encryption algorithm that was used for generating the marking code. After decryption, the PPD is unencrypted and readable. The PPD, or part thereof, is provided to a database selection module 45, which is configured to derive a database identifier (DBID) based on the PPD, optionally by look-up in an associated lookup database 32. The DBID is provided to a communication module 46, which redirects the incoming request to the selected database 31 given by DBID. If the database system 30 is configured with one or more slave SDBs which may have the same DBID as the main SDB, the communication module 46 may be configured, for example by analogy with the traffic manager 40, to apply any suitable traffic-routing protocol to select and direct the request to one of the SDBs, e.g., the SDB that gives the lowest latency, gives a predefined load distribution, or is located in a specific geographic region in relation to the location of the input device 20.

The lookup database 32 may be arranged to associate any data element, or combination of data elements, in the PPD with one or more DBIDs. For example, different ProducerIDs may be assigned different DBIDs, which means that the respective (main) SDB stores marking codes that have been generated for packages produced in any plant of a specific producer. The lookup database 32 provides great flexibility and scalability of the database system since the lookup database 32 may be simply updated to account for new SDBs being added to the database system. Further, the redirection functionality may be simply changed by updating the selection logic of the module 45 and optionally the content of the lookup database 32. For example, the DBID may be given by a combination of ProducerID and PlantID, so that the request is redirected to different SDBs for different plants of the producer. Also, the embodiment in FIG. 4B enables production time data, such as year, to be decisive of DBID. The foregoing presumes that values of at least one data element, or a combination of data elements, in the PPD are globally unique within the database system.

The resource locator 42 also enables use of different types of PPDs, for example comprising different data elements and/or different arrangements of data elements. For example, the database system may be configured to accommodate both the inline example format and the offline example format of PPDs. For example, the module 45 may determine the DBID based on ProducerID for PPDs in the inline example format, and RequestNumber for PPDs in the offline format, assuming that RequestNumber is globally unique. In a variant, the combination of RequestNumber and time period is globally unique and used for determining the DBID. The type of PPD format may, e.g., be indicated in the non-encrypted header portion of the marking code or at one or more predefined bit locations in the PPD. Thus, the module 45 may use either the header portion or the PPD to determine the PPD format and set its selection logic in accordance with the PPD format.

In a variant, the module 45 determines the DBID also based on data in the non-encrypted header portion. It is thus conceivable that extraction module 44 also extracts the header portion from the marking code and provides the header portion, or part thereof, to the module 45.

For reasons of request speed, it may be advantageous to co-locate the lookup database 32 with the resource locator 42, so that they are in geographic proximity of each other, e.g. by being located within the same distribution region. The lookup database 32 will be a relatively small database, at least compared to the total amount of data stored in the SDBs, so replication of the lookup database 32 has no major impact on the performance of the database system 30. Thus, in one embodiment, the lookup database 32 of one resource locator 42 ("main lookup database") is replicated into at least one further lookup database ("slave lookup database") which is co-located with a respective further resource locator 42. Such a replication is schematically indicated by arrows in FIG. 3, where LDB2 of RL2 is replicated into LDB1 associated with RL1 and LDB3 associated with RL3. As understood from the foregoing, such geo-replication is a turn-key function in many commercial databases.

It may be noted that in certain implementations, the lookup database 32 may be omitted, and the module 45 may directly derive the DBID from one or more data elements in the PPD and/or the header portion. For example, the DBID may be equal to the ProducerID, optionally in combination with the PlantID.

It may also be noted that in order to combine the inventive concept of providing a resource locator with the inventive concept of using distribution regions, the respective SDB should be arranged in a relevant distribution region with respect to the marking codes stored in the SDB.

Figure 5:
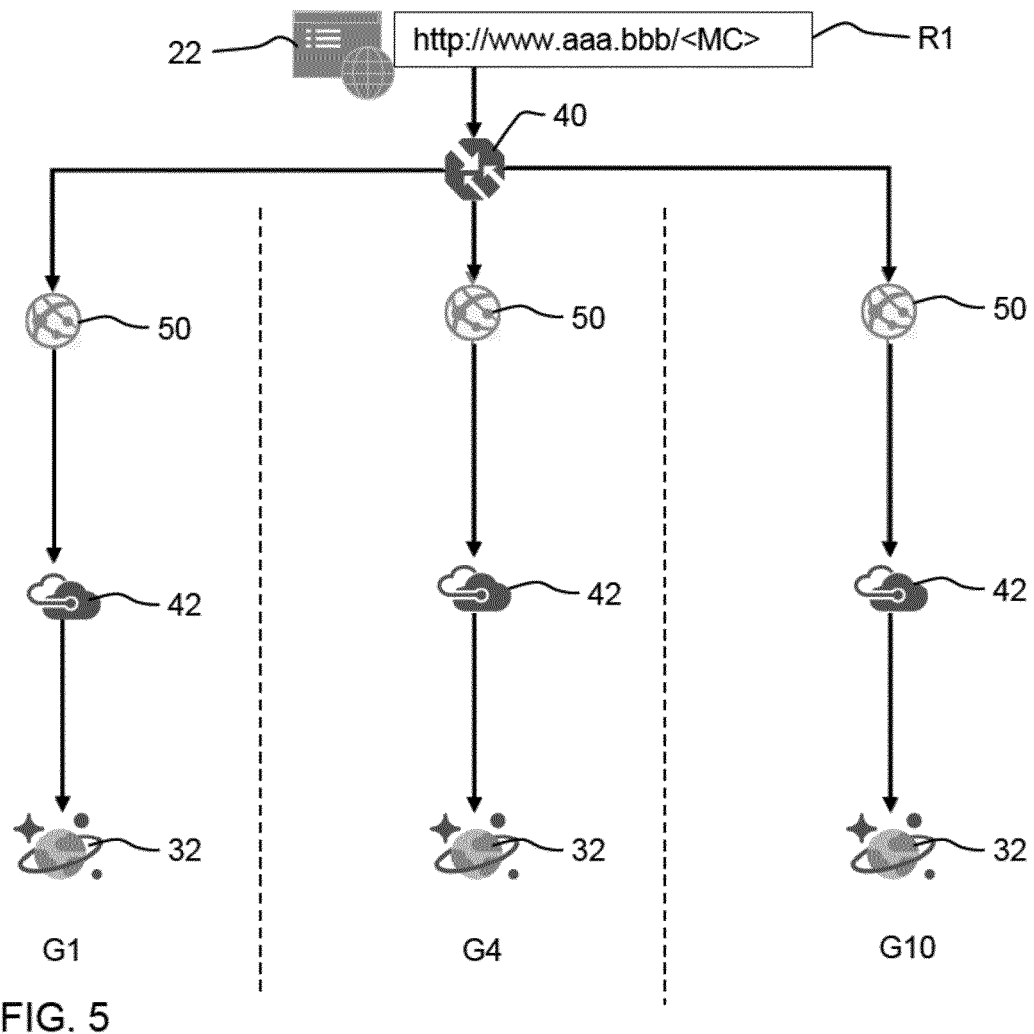
FIG. 5 is a plot of data communication in relation to resource locators in a database system.

FIG. 5 illustrates data pathways in a database system in accordance with an embodiment. The database system comprises three resource locators 42, in a respective distribution region G1, G4, G10. In this example, the request R1 is transmitted from a browser 22 on the input device (not shown) and is in the format of a URL, in which the marking code, MC, is included as a path component after the host name (here www.aaa.bbb). The request R1 is received by the traffic manager 40, which selects one of the resource locators 42, e.g. based on DNS performance of the respective resource locator, and causes the browser 22 to display a landing page 50 of the selected resource locator. Assuming that the browser 22 is located in India, the browser is likely to load the landing page 50 of the resource locator 42 in distribution region G4 (cf. RL2 in FIG. 3). If this resource locator is down, the traffic manager may resolve to the resource locator in distribution region G1 or G10 depending on performance. The selected resource locator 42 then extracts the marking code from the request R1 and determines a selected SDB that stores the marking code, e.g. by lookup in the lookup database 32 that is associated with the selected resource locator 42 (cf. LDB2 in FIG. 3). The request R1 is then forwarded, or otherwise re-directed, by the selected resource locator 42 to the selected SDB. In the example of FIG. 3, if the browser is located in India, it is likely that the request R1 will be forwarded to SDB4 in G4. Finally, SDB4 will be searched, and the marking code and/or related information may be returned from the selected SDB back to the browser 22 in response to the request R1.

Figure 6A:
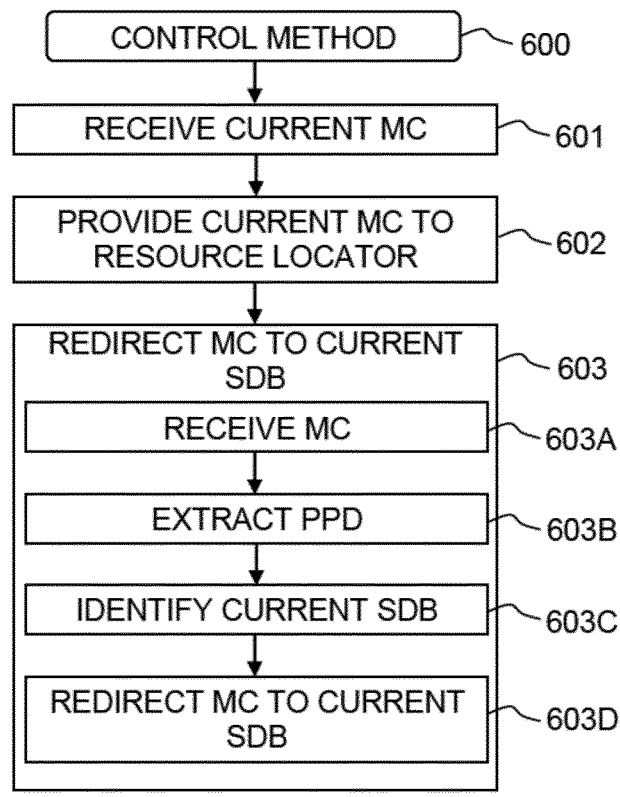
FIGS. 6A-6B are flow charts of control methods for operating a database system in accordance with embodiments.

FIG. 6A is a flow chart of a control method 600 in accordance with an embodiment. The control method may be performed by executing software on one or more computer resources that implement the database system, or part thereof. In step 601, the input sub-system 40 is operated to receive a current marking code (FIG. 4A). In step 602, the input sub-system 40 is operated to provide the current marking code a resource locator 42. In step 603, the resource locator 42 is operated to re-direct the current marking code to a selected ("current") SDB 31. In the illustrated embodiment, step 603 comprises operating the resource locator 42 to receive the marking code (step 603A), extract the PPD from the marking code (step 603B), identify a current SDB based on the PPD (step 603C), and re-direct the current marking code to the current SDB (step 603D).

Figure 6B:
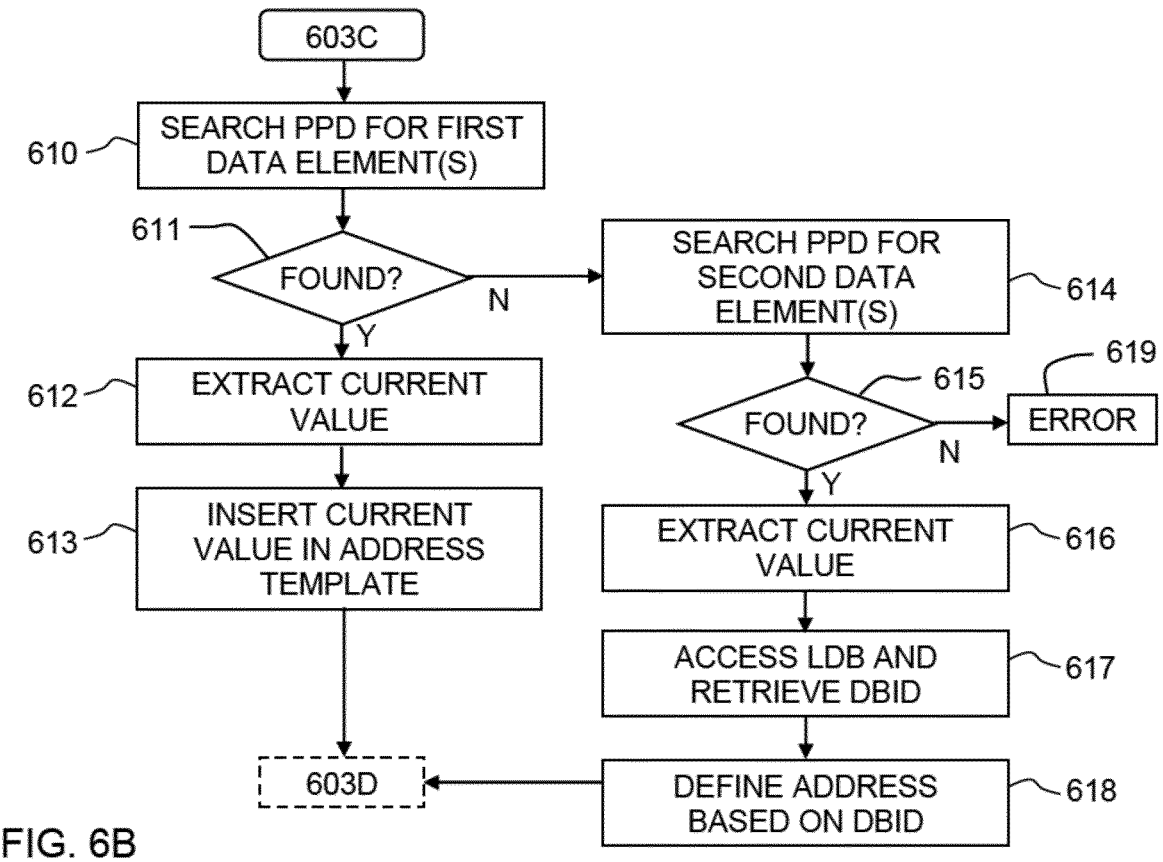

FIG. 6B is a flow chart of an embodiment of step 603C in FIG. 6A. Step 603C may correspond to the above-mentioned selection logic of the module 45 (FIG. 4B). The embodiment in FIG. 6B is capable of handling marking codes with PPDs in different formats, e.g. the above-mentioned inline and offline example formats. Step 603C is performed by the resource locator 42 and comprises a step 610 of searching the PPD for one or more first data elements. The first data element(s) may for example comprise the above-mentioned ProducerID. If the first data element(s) is(are) found (step 611), the method proceeds to step 612 which extracts the current value of the first data element(s), e.g., the current value of the ProducerID. In step 613, the current value is entered into a common address template for the SDBs in the database system to form an address of the selected SDB in the database system. This embodiment presumes that the addresses of the respective SDBs in the database system include the first data element(s) and differ by the value thereof. For example, the addresses of the SDBs may be enumerated in correspondence with the ProducerID. The method then proceeds to step 603D, which re-directs the marking code to the address. If the first data element(s) is(are) not found in the PPD, the method is directed by step 611 to search the PPD for one or more second data elements in step 614, where at least one second data element differs from the first data element(s). If the second data element(s) is(are) found, step 615 directs the method to step 616 which extracts the current value of the second data element(s), e.g., the current value of the RequestNumber, optionally in combination with the time period. In step 617, the lookup database (LDB) 32 is accessed with the current value as search key and the corresponding DBID of a selected SDB is retrieved from the LDB. In step 618, the address of the selected SDB is obtained based on the DBID. The method then proceeds to step 603D, which re-directs the marking code to the address. It is realized that the DBID may define the address of the selected SDB, or at least part thereof. In one example, step 618 is performed by analogy with step 613, and the DBID may, e.g., comprise the ProducerID. If the second data element(s) is(are) not found in the PPD, the method is directed by step 615 to generate an error message, which may be displayed on the input device 20 (step 619).

Figure 7:
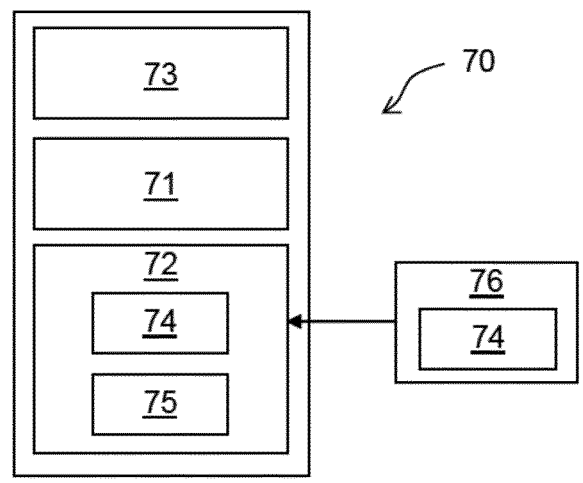
FIG. 7 is a block diagram of a computer resource that may implement at least part of the database system and the control methods thereof.

The structures and methods disclosed herein may be implemented by hardware or a combination of software and hardware. In some embodiments, such hardware comprises one or more software-controlled computer resources. FIG. 7 schematically depicts such a computing resource 70, which comprises a processing system 71, computer memory 72, and a communication interface 73 for input and/or output of data. The communication interface 73 may be configured for wired and/or wireless communication, including communication with the input device 20. The processing system 71 may e.g. include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 74 comprising computer instructions is stored in the memory 72 and executed by the processing system 71 to perform any of the methods, operations, functions or steps exemplified in the foregoing. As indicated in FIG. 7, the memory 72 may also store control data 75 for use by the processing system 72. The control program 74 may be supplied to the computing resource 70 on a computer-readable medium 76, which may be a tangible (non-transitory) product (e.g. magnetic medium, optical disk, read-only memory, flash memory, etc) or a propagating signal.

The invention claimed is:

1. A database system, comprising:
   an input sub-system configured to receive marking codes corresponding to data carriers on packages for liquid food, the respective marking code comprising package production data which uniquely identifies production of an individual package;
   a plurality of code databases configured to store the marking codes, wherein a respective code database among the plurality of code databases is configured to store a respective subset of the marking codes associated with the packages for liquid food; and
   a set of resource locators, wherein a respective resource locator in the set of resource locators is configured to:
   receive a current marking code from the input sub-system,
   extract the package production data from the current marking code,
   select a current code database among a subset of the plurality of code databases based on the package production data in order to minimize latency, wherein databases within the subset of the plurality of code databases store the current marking code, and
   re-direct the current marking code to the current code database.

2. The database system of claim 1, further comprising: a set of lookup databases, wherein the respective resource locator is configured for connection to a respective lookup database in said set of lookup databases, wherein the respective lookup database is arranged to associate different values of at least one data element in the package production data with different code databases among said plurality of code databases.

3. The database system of claim 2, wherein resource locators in said set of resource locators are connected in pairs with lookup databases in said set of lookup databases, wherein the respective lookup database is co-located with the respective resource locator in each of said pairs.

4. The database system of claim 2, wherein said set of lookup databases comprises a main lookup database and one or more replications of the main lookup database.

5. The database system of claim 2, wherein the respective resource locator is further configured to search the package production data for said at least one data element, extract a current value of said at least one data element, and identify, based on said at least one data element, the current code database in a lookup database in the set of lookup databases.

6. The database system of claim 1, wherein the respective code database has an address in the database system, said address including at least one predefined data element in the package production data.

7. The database system of claim 6, wherein the respective resource locator is configured to search the package production data for said at least one predefined data element, extract a current value of said at least one predefined data element, include the current value in an address template to generate the address for the current code database in the database system, and re-direct the current marking code to the address.

8. The database system of claim 6, wherein said at least one predefined data element comprises an identifier of a provider of one or more plants for producing the packages.

9. The database system of claim 1, wherein said set of resource locators comprises two or more resource locators which are arranged in different geographic regions.

10. The database system of claim 1, wherein the respective code database is located in a respective distribution region among a plurality of distribution regions, and wherein said respective subset of the marking codes in the respective code database corresponds to packages that are distributed at least partly within the respective distribution region.

11. The database system of claim 10, wherein the plurality of code databases comprises at least one main code database and one or more replications of the main code database.

12. The database system of claim 1, wherein the package production data is encrypted in the marking code, and wherein the respective resource locator is further configured to decrypt the marking code to extract the package production data.

13. A system, comprising: a package for liquid food, the package having a data carrier containing a marking code, the marking code comprising package production data which uniquely identifies production of the package; and the database system of claim 1.

14. The database system of claim 1, wherein the packages for liquid food are produced by different producers, and wherein the respective subset of the marking codes is associated with the packages for liquid food produced by different producers.

15. A control method for a database system, said control method comprising:
  receiving, by an input sub-system of the database system, a current marking code which corresponds to a package of liquid food and comprises package production data which uniquely identifies production of the package;
  providing, by the input sub-system, the current marking code to a resource locator in the database system; and
  operating the resource locator to:
    extract the package production data from the current marking code,
    select among a subset of a plurality of code databases that store a respective subset of a plurality of marking codes associated with the packages of liquid food, a current code database based on the package production data in order to minimize latency, wherein databases within the subset of the plurality of code databases store the current marking code, and
    re-direct the current marking code to the current code database.

16. A non-transitory computer-readable medium comprising computer instructions which, when executed by a processing system, cause the processing system to perform the method of claim 15.

17. The method of claim 15, wherein the packages for liquid food are produced by different producers, and wherein the respective subset of the plurality of marking codes is associated with the packages of liquid food produced by different producers.

* * * * *